United States Patent [19]
Keith et al.

[11] 3,969,477
[45] July 13, 1976

[54] METHOD OF DEFLUORINATING URANIUM COMPOSITIONS IN A CALCINER

[75] Inventors: W. Gill Keith, San Jose; F. Donald Ferris, San Martin, both of Calif.

[73] Assignee: General Electric Company, San Jose, Calif.

[22] Filed: Mar. 4, 1974

[21] Appl. No.: 448,005

Related U.S. Application Data

[62] Division of Ser. No. 299,356, Oct. 20, 1972, Pat. No. 3,871,829.

[52] U.S. Cl. ............................ 423/19; 252/301.1 R; 423/253; 423/260; 423/261
[51] Int. Cl.² ......................................... C01G 43/02
[58] Field of Search .............. 252/301.1 R; 423/258, 423/260, 253, 261, 19

[56] References Cited
UNITED STATES PATENTS

| 2,981,592 | 4/1961 | Lawroski et al. | 423/260 |
| 3,168,369 | 2/1965 | Reese et al. | 423/261 X |
| 3,212,846 | 10/1965 | Burko et al. | 423/260 |
| 3,249,395 | 5/1966 | Levey | 423/261 |
| 3,260,575 | 7/1966 | Heestand et al. | 423/261 |
| 3,579,311 | 5/1971 | McCoy | 423/261 |
| 3,755,188 | 8/1973 | Grossman et al. | 423/19 X |
| 3,786,120 | 1/1974 | Hollander et al. | 423/261 X |
| 3,808,145 | 4/1974 | Packard et al. | 423/261 X |
| 3,845,193 | 10/1974 | Littlechild et al. | 423/261 |

OTHER PUBLICATIONS

Perry, "Chemical Engineer's Handbook," 3rd Ed., pp. 1608–1609, McGraw-Hill Book Company, Inc. (1950) New York.

Primary Examiner—Edward A. Miller
Attorney, Agent, or Firm—Ivor J. James, Jr.; Sam E. Laub; Samuel E. Turner

[57] ABSTRACT

A method of dehalogenating a particulate composition in a calciner having a heating zone and a cooling zone is presented in which a dehalogenating atmosphere flows through the calciner, including a constricted zone in the calciner, countercurrent to the movement of the composition through the calciner. There is practiced a step of constricting the passage of the controlled atmosphere to a zone of greater flow velocity so that the flow of the dehalogenating atmosphere through the constricted zone substantially minimizes diffusion into the cooling zone of the gaseous impurities removed from the particulate composition in the heating zone.

9 Claims, 7 Drawing Figures

METHOD OF DEFLUORINATING URANIUM COMPOSITIONS IN A CALCINER

This is a division of application Ser. No. 299,356, filed Oct. 20, 1972, now U.S. Pat. No. 3,871,829.

BACKGROUND OF THE INVENTION

This invention relates to an improved method of dehalogenating particulate ceramic powders, and in particular relates to an improved method of defluorinating compositions comprising uranium compounds in a manner substantially insuring absence of recombined fluoride ions with the compositions. Still further this invention relates to an improvement in the form of a baffle means forming a constricted gas flow zone in a rotary calciner having a heating zone and a cooling zone. The constricted zone has a high flow velocity of a defluorinating atmosphere therethrough serving to prevent back diffusion to the cooling zone of the calciner of gaseous impurities removed from the treated compositions in the heating zone of the calciner. This prevents recombination of gaseous impurities with the treated compositions in the cooling zone.

Uranium oxides have various utilities in the nuclear industry. One of the very important utilities of uranium oxides, especially uranium dioxide, is in nuclear power plants as a fuel in the generation of electrical power.

Since it is necessary to enrich uranium with the U-235 isotope for proper operation of the nuclear fuel in the nuclear power plant, this enrichment step is conveniently accomplished with the uranium in the form of uranium hexafluoride. But this compound must then be converted to a solid form such as an oxide for convenience of introduction to the nuclear reactor.

Uranium dioxide is typically produced from a hydrolysis-precipitation-reduction reaction which starts with uranium hexafluoride, and the uranium dioxide can be employed alone or in a mixture with other ceramic additives such as gadolinium oxide, plutonium oxide, silicon dioxide and titanium dioxide as a fuel for nuclear reactors.

In greater detail, one representative method of preparing uranium dioxide from uranium hexafluoride has uranium hexafluoride reacted with water to hydrolyze the fluoride and form a water solution of uranium oxyfloride and an acid. This water solution is reacted wtih ammonia to yield a precipitate of ammonium diuranate in a slurry. The ammonium diuranate slurry is converted to a dry particulate form of uranium dioxide by heating in wet hydrogen which achieves partial defluorination and reduction of the ammonium diuranate to uranium dioxide.

Other methods of converting uranium hexafluoride to uranium dioxide produce a uranium dioxide having varying amounts of fluoride impurities, typically impurity contents of about 3 percent to about 5 percent fluoride. Since the uranium dioxide is in a particulate form it is conveniently charged to a rotary calciner which has in a sequence a feeding (or preheating) zone, an elevated temperature or heating zone and a cooling zone from the uranium dioxide inlet end to the uranium dioxide outlet end of the calciner. The calciner uses gravity for working the particulate uranium dioxide from the inlet end to the outlet end. Typically a gaseous atmosphere is passed in the opposite direction to the movement of the uranium dioxide in the calciner. The gaseous atmosphere typically achieves defluorination of the uranium dioxide while controlling the final oxygen-to-metal ratio of the uranium dioxide. The gaseous atmosphere can have various compositions, such as wet hydrogen, dry hydrogen, a mixture comprising carbon dioxide and carbon monoxide, etc. One improved atmosphere used for this treatment of uranium dioxide is a mixture comprising hydrogen and carbon dioxide as disclosed in U.S. patent application Ser. No. 62,308 entitled "Ceramic Defluorination and Reduction Process", now abandoned in favor of continuation-in-part application Ser. No. 258,738, filed May 9, 1973. The foregoing application was filed August 10, 1970 in the name of Y. Nivas and assigned to the same assignee as the present application.

In the operation of a rotary calciner, it is preferred to pass the gaseous atmosphere countercurrent to the direction of flow of the particulate composition being treated in the calciner. In this manner the incoming atmosphere is initially in contact with the particulate composition having the lowest fluoride content and as the gas composition passes toward the gas outlet of the rotary calciner, it gains in impurity content removed from the particulate composition. In this manner the incoming atmosphere is in contact with the lowest impurity composition near the treated composition outlet of the calciner and there results a minimum impurity content in the particulate composition as it is removed from the treated composition outlet of the calciner.

However in spite of the desirable performance of this process, it has been determined that impurities removed from the particulate composition and carried in the gaseous atmosphere can back diffuse in the calciner (i.e., go against the direction of flow of the gaseous atmosphere through the calciner) so that the impurities come in contact with the treated particulate composition in the cooling zone of the calciner. This produces a problem since the impurities recombine with the particulate composition which lowers the efficiency of the defluorination process.

SUMMARY OF THE INVENTION

A method of dehalogenating a particulate composition in a calciner having a feeding zone, a heating zone and a cooling zone has the steps of passing the composition through the calciner, countercurrently passing a controlled gas atmosphere through the calciner and constricting the passage of the controlled atmosphere to form a zone of greater gas velocity than elsewhere in the calciner. Preferably the zone of greater gas velocity is in the cooling zone at a location near or adjacent to the heating zone of the calciner so that the back diffusion of gaseous impurities from the heating zone to the cooling zone of the calciner is substantially eliminated.

This invention also presents an improvement of providing a zone of greater gas velocity in a calciner comprising locating a baffle means in the calciner chamber, and preferably locating the baffle means in the cooling zone with one face of the baffle means being located at approximately the junction of the heating and cooling zones.

Accordingly it is an object of this invention to provide a method for dehalogenating particulate compositions and minimizing subsequent contact of the particulate composition with the gaseous impurities removed from the particulate composition giving a lower impurity content for the treated particulate composition.

Another object of this invention is to provide a baffle means positioned in the calciner in a manner not impeding the flow of particulate compositions through the calciner but substantially preventing the back diffusion of gaseous impurities and preventing recombination of the impurities with the treated composition.

Still another object of this invention is to provide scoops on the baffle means enabling rapid passage of particulate compositions through the baffle means.

Other objects and advantages of this invention will be apparent to a person skilled in the art from a reading of the following specification and the appended claims along with reference to the attached drawings described immediately hereinafter.

DETAILED DESCRIPTION OF THE INVENTION

Figure 1:
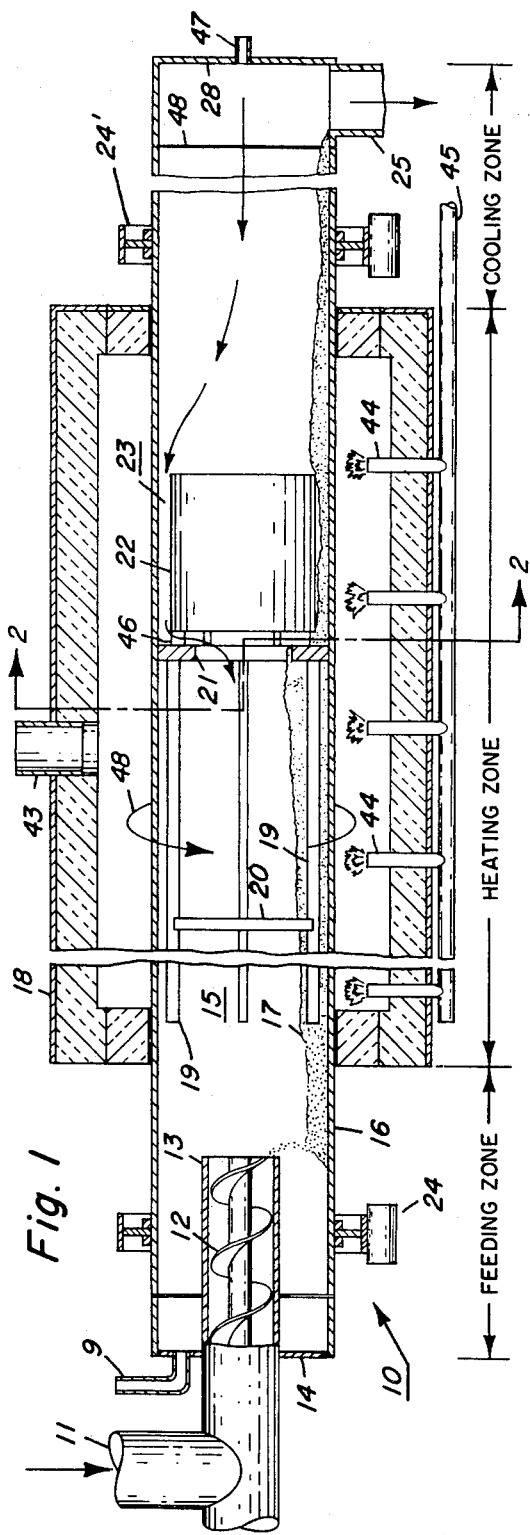
FIG. 1 presents a cross sectional view of a rotary calciner incorporating a baffle means as disclosed in this invention.

This invention involves an improved method of dehalogenating a particulate composition in a calciner having a feeding zone, a heating zone, and a cooling zone involving the steps of feeding the composition to the calciner, passing the composition through the heating and cooling zones of the calciner, countercurrently passing an atmosphere of controlled composition through the calciner and constricting the passage of the controlled atmosphere to form a zone of greater gas velocity than elsewhere in the calciner. This is done preferably in the cooling zone at a location adjacent the heating zone of the calciner so that back diffusion of gaseous impurities from the heating zone to the cooling zone of the calciner is substantially eliminated. The composition can be a dry, particulate composition such as uranium dioxide or a wet slurry such as a thickened slurry of ammonium diuranate.

In a preferred application, this invention presents a method of defluorinating a particulate composition comprising uranium compounds in a calciner having a feeding zone, a heating zone and a cooling zone involving the steps of feeding the composition to the calciner, passing the composition through the heating zone and the cooling zone of the calciner, countercurrently passing an atmosphere of controlled composition through the calciner and constricting the passage of the controlled atmosphere to form a zone of greater gas velocity than elsewhere in the calciner. This again is done preferably in the cooling zone at a location adjacent the heating zone of the calciner so that back diffusion of gaseous impurities from the heating zone to the cooling zone of the calciner is substantially eliminated.

In greater detail, a preferred application of this invention involves a method of defluorinating a particulate composition comprising uranium compounds having a fluoride impurity of the order of about 1 to about 5 weight percent or more in a calciner having a controlled defluorinating atmosphere maintained in the calciner. The compositions comprising uranium compounds capable of being treated in the process of this invention include uranium fluorides, uranium oxyfluorides, alkaline diuranates such as ammonium diuranate, uranium oxides such as uranium dioxide, uranium trioxide, uranium tritaoctoxide ($U_3O_8$), uranium sesquioxide, uranium pentoxide, uranium tetroxide, and mixtures of the foregoing. This invention is also applicable for compositions containing compounds of uranium such as uranium oxides with one or more ceramic additives such as plutonium dioxide, silicon dioxide, titanium dioxide, aluminum oxide ($Al_2O_3$), gadolinium oxide and mixtures thereof. The compositions can include metallic fluoride impurities such as calcium fluoride, magnesium fluoride, sodium fluoride, etc.

The defluorinating atmosphere is maintained in the calciner for chemically combining with the fluoride ions in the uranium compounds and can be comprised of hydrogen, wet hydrogen, dissociated ammonia, wet dissociated ammonia, a mixture of carbon dioxide and carbon monoxide, a mixture of carbon dioxide and hydrogen and mixtures of the foregoing. A different atmosphere can be maintained in the heating zone than in the cooling zone, and the foregoing compositions of the defluorinating atmosphere would be maintained in the heating zone while the cooling zone could have an atmosphere generally non-reactive with the composition or an atmosphere preserving the oxygen-to-metal ratio at a selected value. Representative atmospheres for use in the cooling zone include inert gases (argon), dry hydrogen, wet hydrogen, dry carbon dioxide, wet carbon dioxide, dry carbon monoxide, wet carbon monoxide and mixture of hydrogen and carbon dioxide.

The particulate composition is fed to the calciner chamber such as by a rotating auger and the composition is moved through the calciner at the rate of about 5 to about 20 feet per hour. A representative method uses means for rotating the calciner which is in an inclined position with the inlet end at a higher elevation than the outlet end or having a rotating reel move the composition through an inclined calciner.

The heating zone of the calciner is heated, such as by use of a gas fed burner, or a series of such burners, to a temperature in the range of about 400° to about 800°C, the selected temperature generally depending on the composition of the defluorinating atmosphere. The defluorinating atmosphere is passed countercurrent to the direction of movement of the composition in the calciner and at a flow rate of about 0.5 to about 10 feet per second through the calciner with the volume of atmosphere introduced to the calciner depending on the volume defined by the housing of the calciner. In the calciner, preferably in the cooling zone adjacent to the heating zone of the calciner, the gas flow is constricted to form a region of greater gas velocity than occurs in the remainder of the calciner and this substantially eliminates any back diffusion of gaseous impurities from the heating zone to the cooling zone of the calciner. As the composition passes through the calciner, it is first preheated in the feeding zone, then heated to an elevated temperature in the heating zone and finally cooled sufficiently in the cooling zone for discharge to the atmosphere without danger of reaction of the composition with the atmosphere.

Figure 2:
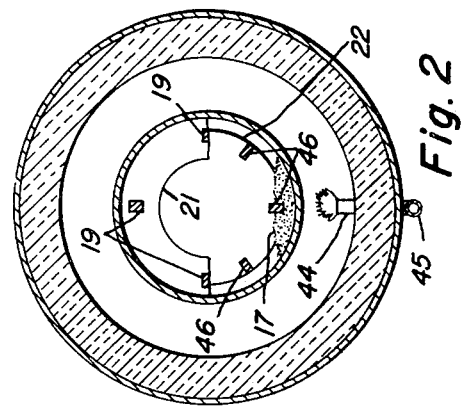
FIG. 2 presents a sectional end view of the rotary calciner of FIG. 1 looking along the line 2—2 of FIG. 1.

This invention includes an improvement in a calciner comprising positioning a baffle means in a calciner chamber with one embodiment being the arrangement shown in FIG. 1 which will now be described in detail. The number 10 generally designates a calciner with a feeding zone, a heating zone and a cooling zone as shown in FIG. 1 with a cross sectional view being shown in FIG. 2. The calciner has a feeding means for introducing a particulate composition 17 such as a particulate uranium containing composition. One example of the feeding means is a feed pipe 11 which feeds the particulate composition to rotating auger 12 in auger housing 13 sealed in chamber lid 14. Where a thickened slurry is to be introduced into calciner housing 16, an arrangement as set forth in U.S. Pat. No. 3,579,311 can be employed. Chamber housing 16 defines chamber 15 which receives the particulate composition 17 as it falls from the auger 12. Chamber housing 16 has an outlet 9 for the exit of the controlled atmosphere in the calciner and a heating jacket 18 housing heating means such as gas fired heating elements 44 supplied by gas line 45. The heating jacket 18 surrounds chamber housing 16, has exhaust 43 and generally defines the heating zone as shown in FIG. 1. A series of flights 19 are held together by flight ring 20 and particulate dam 21 which dam is connected to chamber housing 16, and the flights 19 are provided for stirring the composition 17 enabling excellent gas-solids contact in chamber 15 and expediting treatment of composition 17. Dam 21 is in the form of a ring abutting chamber housing 16 and dam 21 serves to temporarily restrain composition 17 in chamber 15 so that it is subjected to a longer treatment in the heating zone. While FIG. 1 shows a calciner incorporating a dam, the dam is not required and can be omitted in which event flights 19 are connected to housing 16 directly. As shown in FIG. 1, flights 19, flight ring 20 and dam 21 form an integral unit connected to housing 16 by dam 21 and this unit rotates as housing 16 is rotated by drive means 24 and 24' at each end of the housing 16. This serves to circulate composition 17 to enable gas-solids contact and further accelerate the treatment of composition 17. Baffle means 22 is connected to dam 21 by a series of rods 46 so that the baffle means 22 rotates with the housing 16 in the direction of the arrow 48, and the preferred configurations of baffle means 22 will be described in greater detail when discussing FIGS. 3–5 below. Baffle means 22 serves to restrict the passage of the gaseous atmosphere in the portion of chamber 15 in which the baffle means is located to zone 23. The controlled atmosphere is introduced through inlet 47 and the particulate composition 17 is removed through outlet 25. Chamber outlet 25 and chamber lid 28 are stationary and are connected to chamber housing 16 by an air-tight seal 48.

Figure 3:
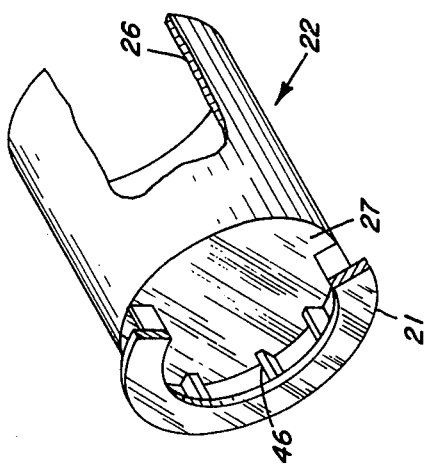

Referring now to FIG. 3 there is shown an isometric view of one preferred form of the baffle means 22 with a portion of the baffle means 22 cut away to more clearly illustrate this embodiment and the connection of the baffle means 22 to dam 21 by rods 46. The baffle means 22 has a cylindrical shell 26 connected to an end plate or face 27 such as by welding which end plate is suitable for connection to the dam 21 in calciner 10 by rods 46. The baffle means is similar to a cylindrical can with one end open, but a closed cylindrical can (or can with an end plate 27 at each end) can also be used. When the baffle means is positioned in the calciner the orientation of the open end is not critical but as shown in FIG. 1 the open end is toward the outlet 25. The fact that end plate 27 is a solid surface forces the controlled atmosphere being introduced into chamber 15 to flow around baffle means 22 in order to move toward outlet 9 as illustrated by the arrows in chamber 15.

Figure 4:
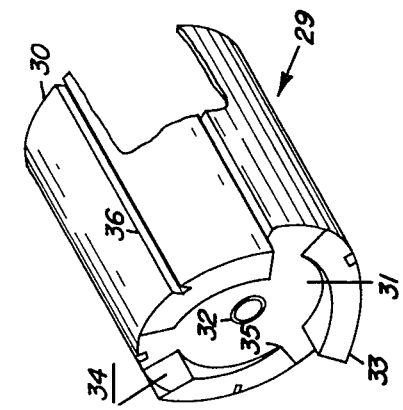
FIGS. 3–5 show isometric views of different embodiments of the baffle means with portions being cut away to more clearly illustrate each baffle means.

Another embodiment of the baffle means is presented in FIG. 4 in an isometric view and the baffle is generally designated by number 29. The baffle means 29 has a cylindrical shell 30 forming one open end and connected to an end plate (or face) 31 to form one closed end which has opening 32 and scoops 33. Opening 32 is generally circular and the controlled atmosphere of the calciner will flow through this opening 32, and opening 34 in scoops 33 and between baffle means 29 and the housing 16 of the calciner. The scoops 33 have one side protruding away from plate 31 at the opening 34. The scoops 33 on the baffle means 29 pick up or scoop up the particulate composition so that some of the composition passes inside the baffle means 29 in addition to flowing in the opening between the baffle means 29 and the housing 16 of the calciner so that some of the composition passes on its way through the baffle means to reach the outlet 25. Cylindrical shell 30 has slots 36 for receiving flights 19 which will support baffle means 29 in the calciner.

In a discussion of greater detail of the operation of this baffle means 29, the scoops 33 pick up some of the powder so that it passes through the baffle. As the baffle rotates with the flight assembly and calciner housing, the particulate composition is removed from the bed by the scoops. As the rotation continues, the powder slides through the baffle to the open end 30 of the baffle. Further the openings 34 formed by the scoops, along with opening 32 in the end plate 31, permit the passage of the controlled atmosphere therethrough. Slots 36 are spaced about baffle means 29 and are of a size to receive the flights 19 of the calciner so the flights carry the baffle means as the flights revolve.

Figure 5:
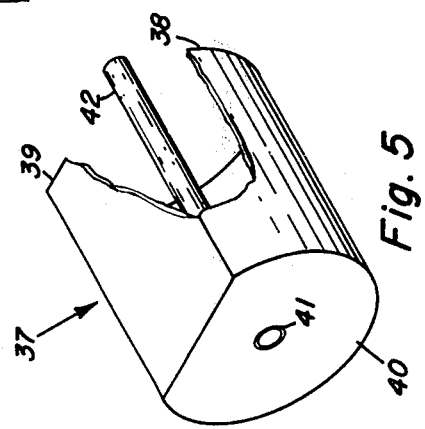

Still another embodiment of the baffle means is presented in FIG. 5 in which 37 designates the baffle means of generally cylindrical shape for cylindrical wall 38 with a non-cylindrical flattened portion 39. This can be easily constructed by cutting away a portion of a cylinder and welding a flat plate 39 to the remaining portion of the cylindrical wall 38. An opening 41 in end plate (or face) 40 is provided for rod 42 (the full length of which is not shown in FIG. 5) which is adapted to fit into a corresponding opening in chamber lid 28 of calciner 10 in FIG. 1. When this embodiment is assembled in the calciner, rod 42 is fastened or welded to chamber lid 28, and the baffle means 37 is stationary in calciner 10 since chamber lid 28 is stationary. There would be no connection between the baffle means and the dam or flight assembly in the calciner. The orientation of the flat portion 39 is not critical but is preferably mounted so that it is directly above the moving bed of the particulate composition 17 enabling easy passage of the composition 17 between the baffle means 37 and the calciner housing 16. In this position the controlled atmosphere in the calciner passes through chamber 15 flowing through the opening between the baffle means 37 and the chamber housing 16. This creates a region of high flow velocity around the baffle means 37 which substantially minimizes any tendency of the gaseous impurities in the controlled atmosphere in the region of the flights 19 from back diffusing toward the outlet 25. This substantially eliminates any subsequent recombination of the removed impurities with the treated composition in the cooling zone.

The dimensions of the baffle means are designed to provide a high flow velocity region of sufficient extent to substantially minimize the back diffusion of gaseous impurities extracted from the particulate composition in the heating zone of the calciner. The length of the baffle is determined by the length of the high flow velocity region selected for minimizing back diffusion of the impurities and has a size in the range of about one-fourth the diameter of the baffle means up to the diameter of the baffle means (or greater) when the chamber of the calciner is cylindrical in shape (e.g., when the diameter of the baffle means is 6 inches its length could vary from about 1½ to 6 inches or greater). The diameter of the baffle is determined by the velocity desired for the controlled atmosphere as it passes between the baffle and the calciner housing and preferably the diameter is about 0.75 to about 0.95, preferably about 0.8 to about 0.9, of the diameter of the calciner. In practice it is desirable to achieve a volume between the baffle and the housing of the calciner in which a flow rate of the controlled atmosphere of at least about 2 feet per second can be easily achieved. When scoops are on the baffle, preferably three scoops are employed. The dimensions of the open end of the scoop will be described in terms of the axial dimension (length) and radial dimension (width) for a rectangular opening. The axial dimension of the scoop is determined by the average linear velocity of the particulate composition as it moves through the calciner chamber and the rate of rotation of the flight assembly and is preferably about 1 inch to about 1½ inches. The radial dimension of the scoop is determined by the depth of the bed of the particulate composition in the vicinity of the baffle and is preferably about 1½ inches to about 2 inches.

Any material not reactive with the impurities contained in the particulate composition or the particulate composition can be used for constructing the baffle and representative materials include Monel, Inconel, Hastalloy, and nickel.

The method of this invention and the baffle means for use in a calciner have been described in general and for a particularly preferred application for treating uranium compounds with a controlled atmosphere for removal of impurities such as fluorides therefrom. However it will be readily apparent to a person having ordinary skill in the art that other particulate materials containing impurities can also be treated for removal of impurities with improved results through the use of the method and baffle means mounted in a calciner as presented in this invention. Among other particulate materials capable of such treatment are titanium dioxide, zirconium dioxide, plutonium dioxide, gadolinium oxide and hafnium oxide.

The invention is further described by the following examples of which Example 1 is offered to be illustrative of the prior art practice and Example 2 is offered to be illustrative of this invention and does not serve to limit the invention in any manner.

EXAMPLE 1

Figure 6A:
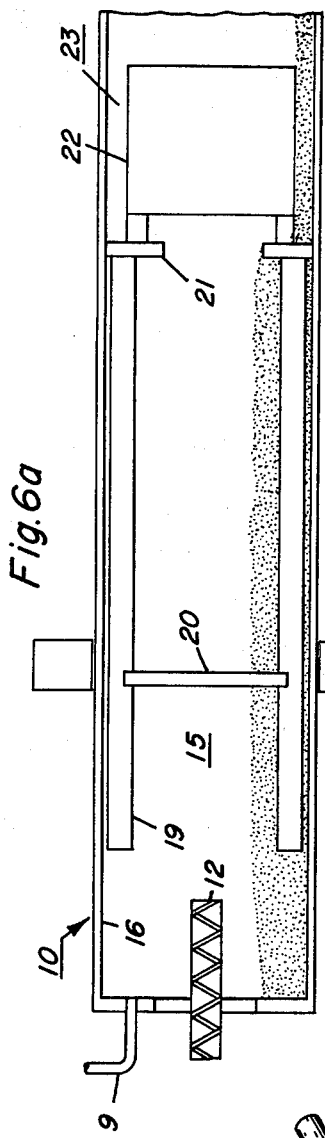
FIG. 6(a) shows a cross sectional schematic view of a rotary calciner.
Figure 6B:
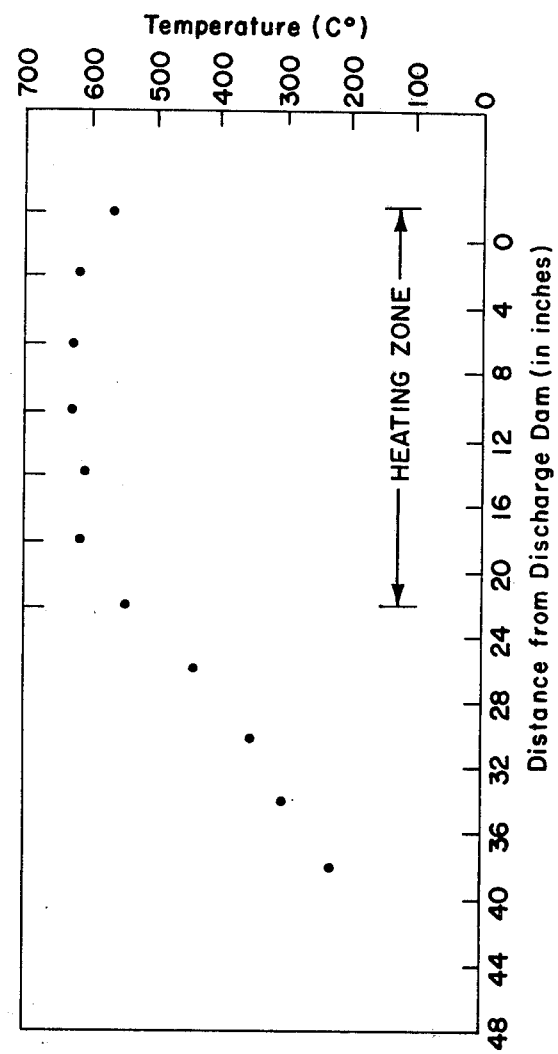
FIG. 6 (b) is a corresponding graph showing the temperature profile of the calciner of FIG. 6 (a), wherein the distance of the graph corresponds to the distance of the calciner, for an experimental run as described in Example 1.

The calciner shown in schematic simplified form in FIG. 6 (with numbers corresponding to FIG. 1) is used without a baffle for defluorinating a particulate composition rich in uranium dioxide having an average particle size of 800 microns, a fluoride ion content of 30,000 to 50,000 parts per million and an oxygen-to-metal ratio of 2.7. The calciner is fed with a screw auger 12 which is one inch in diameter, and the calciner has a chamber 15 which has an inside diameter of 6½ inches and a length of 78 inches from the outlet of the auger to outlet 25 (not shown in FIG. 6). The chamber wall (housing) 16 is made of Inconel, and heating is accomplished by natural gas combustion which serves to define the heating zone which extends 24 inches, beginning 18 inches from the outlet of the auger. Two gas inlets (not shown) of ½ inch in diameter are provided for introducing a controlled atmosphere into the calciner, and one outlet 9 which is 1 inch in diameter is provided for removal of the controlled atmosphere. A series of flights 19 which are 36 inches long are held together in the heating zone by flight ring 20 and are attached to dam 21. The dam 21 is in the form of a ring having an inner diameter of 3 inches and an outer diameter of 6½ inches and is attached to the chamber wall 38 inches from the outlet 25 (not shown) for removal of the treated uranium dioxide. The end of the calciner receiving the composition is at a higher relative elevation than the outlet end of the calciner so that the calciner is inclined ⅛ inch per foot of calciner length. The flights are rotated as the calciner housing 16 is rotated at the rate of 1½ revolutions per minute to circulate the powder in the calciner.

Three hundred pounds of the uranium dioxide described above are fed substantially uniformly to the calciner over a period of 150 hours. A gas comprising a mixture of 50% by volume carbon dioxide and 50% by volume hydrogen is fed to the furnace at the rate of 75 standard cubic feet per hour. The calciner is operated at 1½ revolutions per minute. The average residence of a particle of uranium dioxide in the calciner is about 5 hours. The temperature of the heating zone is in the range of 575° to 625°C, and the temperature of the cooling zone varies from 500°C near the heating zone to 100°C near the outlet.

The powder withdrawn from the furnace is analyzed for fluoride ion content by pyrohydrolysis. This revealed a fluoride content ranging from 1,000 to 4,000 parts per million with an average of 2,000 parts per million.

EXAMPLE 2

A baffle means 22 in the form of a cylindrical can open at one end with a diameter of 5 inches and a length of 6 inches was installed in the calciner of Example 1 with the end plate attached to the dam 21 and located ⅝ inch from the dam 21 on the cooling zone side of the dam as shown in FIG. 3. The baffle was radially centered in chamber 15.

Two hundred and fifty pounds of a particulate composition rich in uranium dioxide having an average particle size of 800 microns, a fluoride ion content of 30,000 to 50,000 parts per million and an oxygen-to-metal ratio of 2.7 was fed to the furnace over a period of 100 hours. The same 50% $H_2$ — 50% $CO_2$ atmosphere was used and fed at the rate of 80 cubic feet per hour. The gas velocity between the baffle and the cylinder wall was estimated at 1½ feet per second. The temperature conditions, operation of the calciner and rotation of the flight assembly were the same as in Example 1 and the temperature profile in FIG. 6 is shown in graph form. The treated uranium dioxide from this Example 2 had a significant drop in fluoride ion content to 200 to 500 parts per million with an average of 300 parts per million.

It is to be understood that although the invention has been described with specific reference to particular embodiments thereof, it is not to be so limited, since changes and alterations therein may be made which are within the full intent and scope of this invention as defined by the appended claims.

What is claimed is:

1. A method of defluorinating a composition comprising uranium compounds containing fluoride impurities in a calciner having in sequence a feeding zone, a heating zone, and a cooling zone, comprising the steps of
   a. feeding the composition into the feeding zone of the calciner,
   b. passing the composition through the heating zone and the cooling zone of the calciner,
   c. countercurrently passing an atmosphere capable of defluorinating the composition through the calciner so that said impurities are removed in gaseous form by reaction with the atmosphere, and
   d. constricting the passage of the atmosphere in a portion of the cooling zone adjacent the heating zone to produce a zone of greater flow velocity than elsewhere in the calciner so that the gaseous impurities removed from the composition in the heating zone are substantially prevented from diffusing to the cooling zone of the calciner.

2. A method according to claim 1 in which the atmosphere in the calciner is a mixture of hydrogen and carbon dioxide.

3. A method according to claim 1 in which the composition is a particulate composition and is comprised of uranium oxide.

4. A method according to claim 3 in which the composition is comprised of uranium dioxide.

5. A method according to claim 1 in which the atmosphere is passed through the calciner at the rate of about 0.5 to about 10 feet per second.

6. A method according to claim 1 in which the velocity of the atmosphere is at least about 2 feet per second in said portion of the cooling zone adjacent the heating zone.

7. A method according to claim 1 in which the composition is in the form of a slurry and is comprised of ammonium diuranate.

8. A method according to claim 1 in which the atmosphere is selected from the group consisting of hydrogen, wet hydrogen, dissociated ammonia, wet dissociated ammonia, a mixture of carbon dioxide and hydrogen and mixtures of the foregoing.

9. In a method of defluorinating and controlling the oxygen-to-metal ratio of a particulate uranium oxide containing composition containing fluoride impurities in a calciner having a heating zone, a cooling zone and an atmosphere capable of defluorinating the composition including the steps of passing the composition through the calciner, passing the atmosphere countercurrent to the passage of the composition through the calciner, heating the composition at a temperature in the range of about 400° to about 800°C under the atmosphere, the improvement comprising restricting the passage of the atmosphere to a zone of greater flow velocity with said zone of greater flow velocity starting at about the junction of the heating zone and the cooling zone of the calciner and extending into the cooling zone so that the diffusion of gaseous impurities from the heating zone to the cooling zone of the calciner is substantially eliminated.

* * * * *